J. C. FOSTER.
SPRING OPERATED MOTOR.
APPLICATION FILED JUNE 9, 1920.
1,421,932. Patented July 4, 1922.
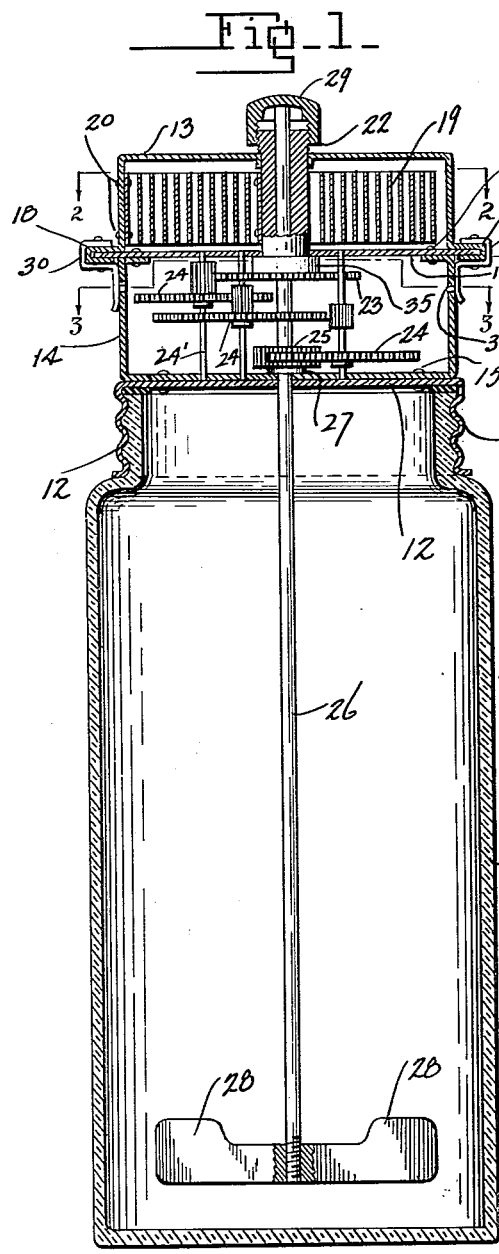
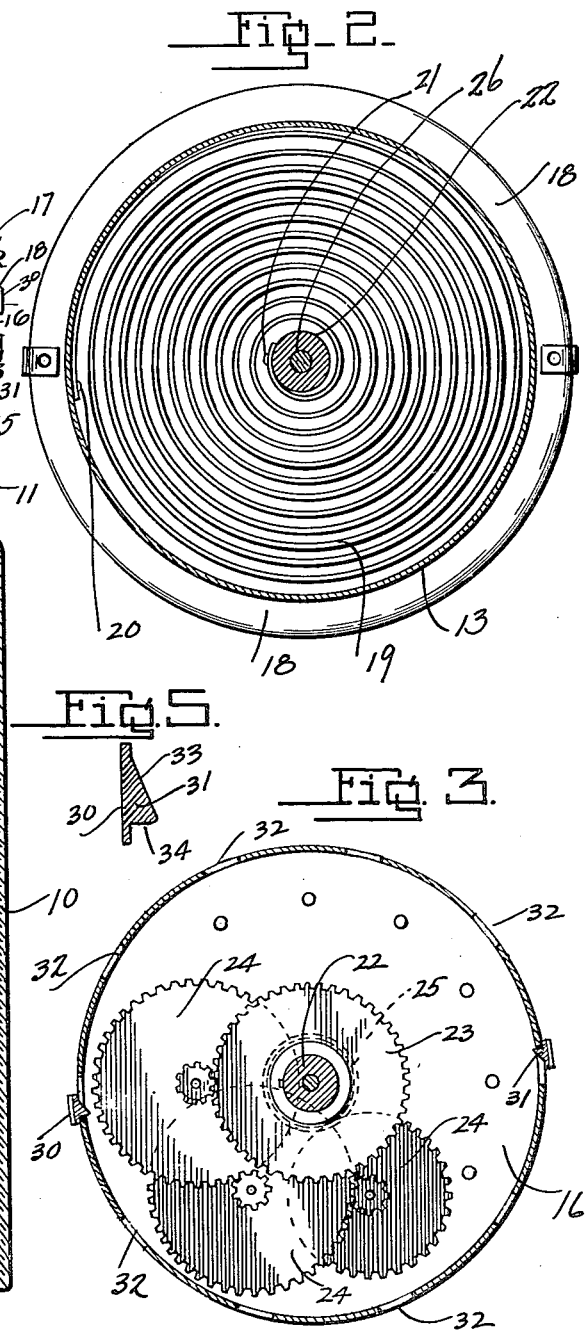
Inventor
John C. Foster
By Lancaster and Allwine
his Attorneys

UNITED STATES PATENT OFFICE.

JOHN C. FOSTER, OF NEW YORK, N. Y.

SPRING-OPERATED MOTOR.

1,421,932.  Specification of Letters Patent.  Patented July 4, 1922.

Application filed June 9, 1920. Serial No. 387,634.

*To all whom it may concern:*

Be it known that I, JOHN C. FOSTER, a citizen of the United States, residing at New York, in the county of New York and State of New York, have invented certain new and useful Improvements in Spring-Operated Motors, of which the following is a specification.

My invention relates to spring operated motors.

An important object of my invention is the provision of a mechanically operated motor, capable of effectively and efficiently mixing various substances.

A further object of the invention is to provide a device of the above described character having a speed regulating attachment, for varying the speed of the mixer to suit the mixing of various liquids, such as: malted milk; iced drinks; egg nog; or of beating various substances, such as: whipped cream; eggs and the like.

A further object of the invention is to provide a device of the above described character capable of being easily attached to the ordinary type of preserving jar.

Other objects and advantages of the invention will be apparent during the course of the following description.

In the accompanying drawings forming a part of this specification and in which like numerals are employed to designate like parts throughout the same.

Figure 1, is a central vertical sectional view of the spring operated mixer constructed in accordance with the invention.

Figure 2 is a cross sectional view taken on the line 2—2 of Figure 1.

Figure 3 is a cross sectional view taken on the line 3—3 of Figure 1.

Figure 4 is a plan view showing the preferred type of mixing blade.

Figure 5 is a cross sectional view of the type of stop used to facilitate winding of the device.

In the drawings, wherein for the purpose of illustration is shown a preferred embodiment of my invention, the numeral 10 designates a receptacle, such as an ordinary preserving jar, the neck of the receptacle being externally screw threaded as shown at 11, for detachably mounting thereon the base 12 of the spring operated mixer.

The mechanism of the spring operated mixer is preferably located within an upper or rotatable casing 13 and a lower or stationary casing 14, the lower casing being securely fastened to the base 12 by rivets 15. A plate 16 is secured to the lower casing by rivets 17 and provides an annular flange projecting beyond the outer side of the casing 14 as clearly shown in Figure 1 of the drawing. The upper or rotatable casing 13 is provided with an annular recessed flange, said recess adapted to engage the part of the plate 16 extending beyond the casing 14.

Mounted within the upper or rotatable casing 13 is a spiral operating spring 19 securely fastened at its outer end to the inside of casing 13 by rivets 20. The inside end of the spiral spring is fastened by means of rivets 21 to a sleeve 22 rotatably mounted within the upper and lower casings. The lower end of the rotatable sleeve 22 projects within the casing 14, having mounted thereon a gear 23, said gear meshing with a series of co-meshing gears 24, mounted within the lower casing 14, said gears having shafts 24′, bearing on the plate 16 and the floor or bottom of the casing 14. Each of the gears being designed to increase the speed of its succeeding gear. The last of the series of co-meshing gears meshes with a gear 25, keyed or securely fastened to a shaft 26, said shaft depending into the receptacle 10. The gear 25 has a projecting portion or hub 27 formed integral therewith, said hub resting upon the floor or bottom of the casing 14 and supporting the shaft 26 within the receptacle 10. The upper portion of the rod or shaft 26 projects through the sleeve 22, the lower portion of said rod being screw threaded, the screw threads being adapted to detachably receive the mixing blades 28.

The sleeve 22 projects upwardly through the casing 13, its upper end being screw threaded to receive a hollow nut 29, the internal face of the hollowed portion bearing against the top of the shaft 26 for regulating the speed of rotation of the mixing blades.

The annular recessed flange 18 of the casing 13 is provided with a plurality of spring clips 30 securely riveted thereto, said clips having integral therewith a projection 31, arranged to fit into a plurality of slots 32 in the casing 14. The projections 31 have a cam face 33 thereon, designed for easily permitting the projections 33 to ride out of the slots 32 thus permitting the rotation of casing 13 in one direction.

In operation the spring 19 is first wound by manually rotating the casing 13, while holding the lower casing 14 and jar 10 stationary. The abrupt faces 34 of the projections 31 coming in contact with the faces of the slots 32 prevent expansion of the spring 19, from rotating the casing 13 in a direction opposite to that of winding, the force of said spring is thus directed through sleeve 22 to the series of co-meshing gears 24 and finally to the shaft 26 and mixing blades 28. In order to slow the speed of operation of the mixing blades the adjusting nut 29 is tightened upon the sleeve 22, this having the effect of forcing the hub 27 of gear 25, against the bottom of casing 14; and of also forcing the shoulder 35 of the sleeve 22 against the under surface of the plate 16. The friction produced by the contact of these surfaces is sufficient to vary the speed of rotation of the blades to suit different requirements.

It is to be understood that the forms of my invention herewith shown and described are to be taken as preferred examples of the same, and that various changes in the shape, size and arrangements of parts may be resorted to without departing from the spirit of the invention or the scope of the subjoined claims.

I claim:

1. In a spring motor, the combination of a casing, a shaft rotatably carried by said casing, a sleeve rotatably mounted upon said shaft, a spring connecting said casing and sleeve, means operatively connecting said sleeve and shaft, and means adjustably mounted on said sleeve exteriorly of said casing, and engaging said shaft for regulating the speed ratio thereof.

2. In a device of the character described, the combination, of a stationary casing, a rotatable casing mounted upon said stationary casing, a shaft rotatably disposed through said casings, a spring mounted within the rotatable casing and connected at its outer end thereto, and means connecting the inner end of said spring and said shaft to impart movement to the shaft upon expansion of the spring.

3. In a device of the character described, the combination with a stationary casing, a rotatable casing mounted upon said stationary casing, a shaft centrally and rotatably carried by said casing, said shaft extending through both of said casings, a spring mounted within the rotatable casing and connected at its outer end thereto, and means connecting the inner end of said spring and said shaft to impart movement to the shaft upon expansion of the spring, said last mentioned means including a speed ratio increasing means operatively disposed within said stationary casing.

4. In a spring operated motor, the combination, of a stationary casing, a rotatable casing mounted upon said stationary casing, a rotatable sleeve disposed within the casings, a gear mounted upon the lower end of said sleeve, a spring mounted in said upper casing, said spring being secured to said rotatable casing and said rotatable sleeve to impart movement to the sleeve, a series of co-meshing gears arranged within the stationary casing, said gears meshing with the gear on the rotatable sleeve, a rod bearing within the sleeve and extending exteriorly of the stationary casing, and a gear securely mounted upon said rod, said gear meshing with the last of the series of co-meshing gears to impart rotation to the rod.

5. In a spring operated motor, the combination, of a stationary casing, a rotatable casing mounted upon said stationary casing, an operating spring arranged within the rotatable casing, a rotatable sleeve disposed within the casings having a flange thereon bearing on the inner surface of the stationary casing, and its upper end projecting upwardly through the rotatable casing, said upper end being screw threaded, a rod, a gear mounted upon said rod and bearing on the inner surface of the stationary casing, means connecting said sleeve and gear to impart movement to the rod upon expansion of the spring, and a hollow nut mounted upon the screw threaded portion of the rotatable sleeve, the inner surface of said nut bearing against the upper end of the depending rod for forcing the gear mounted upon said rod and the flange upon the rotatable sleeve into frictional engagement with the inner surface of the stationary casing, upon tightening the nut.

6. In a spring operated motor, the combination of, a stationary casing, having slots therein, a rotatable casing mounted upon said stationary casing, a rod, an operating spring mounted within and secured to the rotatable casing, means connecting said rod and said operating spring to impart movement to the rod, upon expansion of the spring, and a spring clip mounted upon the rotatable casing having stops thereon to work within the slots of the stationary casing, to prevent winding of the spring upon rotation of the rotatable casing.

7. In a device of the character described, the combination, of a casing, a hollow sleeve rotatably disposed within said casing and projecting upwardly therefrom, a central shaft disposed within said hollow sleeve and rotatable therein, a spiral spring connecting said casing and said hollow sleeve to impart rotation to the hollow sleeve upon expansion of the spring, a series of co-meshing gears connecting said hollow sleeve to said central shaft to impart rotation to the central shaft upon rotation of the hollow sleeve, a hollow nut mounted upon said upwardly projecting portion of the sleeve to engage said upwardly projecting portion of the hollow sleeve, said hollow nut adapted to be adjusted upon the projecting portion of the sleeve to provide a frictional engagement between the hollow sleeve, the shaft and the casing, to vary the speed of rotation of the shaft.

JOHN C. FOSTER.